T. M. K. OVERLAND.
PHOTOGRAPHIC FILM ROLL.
APPLICATION FILED SEPT. 4, 1908.

937,262.

Patented Oct. 19, 1909.

Witnesses
Walter B. Payne.
Nelson Copp.

Inventor
Thomas M. K. Overland
By Church & Rich
his Attorneys

UNITED STATES PATENT OFFICE.

THOMAS M. K. OVERLAND, OF RIVER FOREST, ILLINOIS, ASSIGNOR TO EASTMAN KODAK CO., OF ROCHESTER, NEW YORK, A CORPORATION OF NEW YORK.

PHOTOGRAPHIC-FILM ROLL.

937,262.  Specification of Letters Patent.  Patented Oct. 19, 1909.

Application filed September 4, 1908. Serial No. 451,734.

*To all whom it may concern:*

Be it known that I, THOMAS M. K. OVERLAND, a citizen of Norway, and residing at River Forest, in the county of Cook and State of Illinois, have invented certain new and useful Improvements in Photographic-Film Rolls; and I do hereby declare the following to be a full, clear, and exact description of the same, reference being had to the accompanying drawings, forming a part of the specification.

My invention relates to means for manipulating and securing rolls of flexible material particularly photographic film and particularly the so-called daylight loading cartridges for cameras, embodying a strip of opaque flexible material as paper and a shorter strip of sensitized photographic film adapted to be wound therewith upon a spool or center, and it has for its object to provide means which not only facilitates the removal of an exposed roll or film from the camera or roll holder but which also serves as a fastening device for preventing the film or flexible material from unrolling.

The invention consists generally in the employment upon the outer convolution of a wound strip of flexible material, such as the paper of a film cartridge, of a flexible flap or extension which overlaps the free end and not only serves as a manipulating handle to assist, in connection with the free end of the paper, in removing the roll from a recess or holder but also as a securing means for said free end. This arrangement of parts is capable of use with other wound flexible strips but is especially adapted for photographic film.

To these and other ends the invention consists in certain improvements and combinations of parts all as will be hereinafter more fully described, the novel features being pointed out in the claims at the end of the specification.

Figure 1:
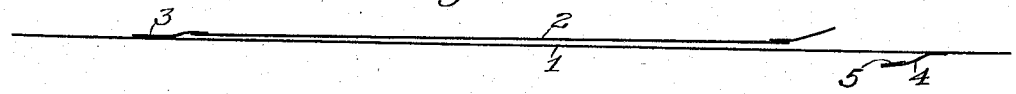
Figure 2:
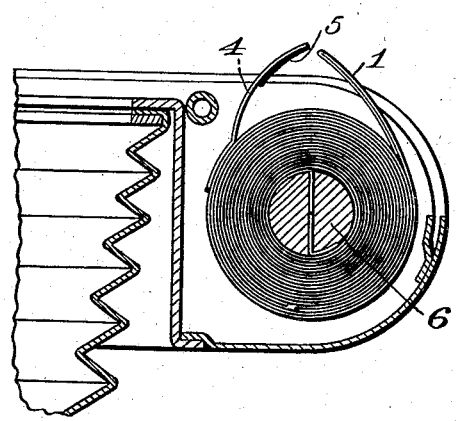
Figure 3:
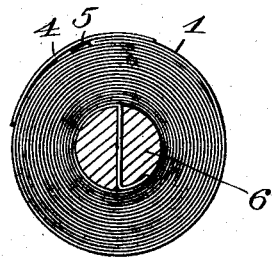
Figure 4:
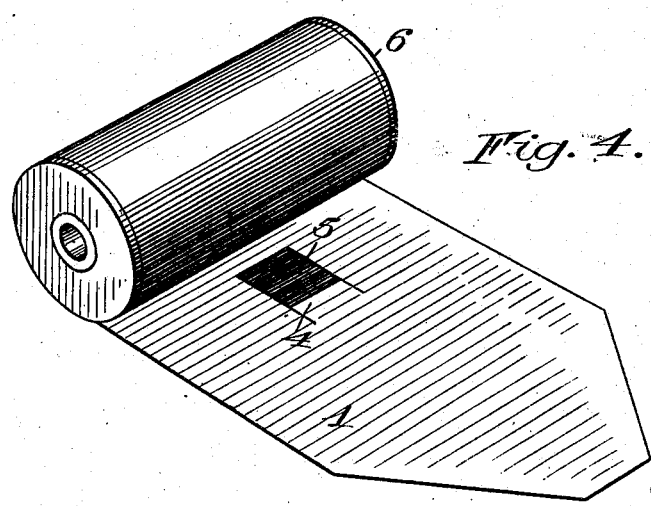

In the drawings: Figure 1 is a view of the strips constituting a film cartridge embodying my invention. Fig. 2 is a sectional view through a portion of a camera showing the manner of removing a cartridge or roll. Fig. 3 is a view of a film cartridge after removal and with the free end of the strip secured. Fig. 4 is a view of a modification.

Similar reference numerals in the several figures indicate similar parts.

The well known film cartridges consist generally of a strip of black paper indicated by 1 and a shorter strip of sensitized photographic film indicated by 2, shorter than the black paper and secured at one end to the latter as at 3 and having its rear or opposite end free as shown or attached to a suitable flexible strip or connection, when the film is adapted for development in a developing machine (as in Patent No. 883,819). Upon the outer side of the rear or free end of the black paper, or that opposite the point of attachment 3 of the film, is arranged a short flap 4 preferably of paper which in the preferred form is formed of a strip of paper adhering at one end to the paper 1 while the inner side of its free end is provided with dried gum as indicated at 5. This flap is located in such position relative to the rear free end of the black paper that it will overlap the latter when the cartridge is wound on its spool after exposure and by first moistening the gum and pressing it on said end it is used to secure it and prevent the film from unwinding.

In use in the camera or roll holder the paper and film is wound on a spool or spindle with the end at which the connection 3 is made, outside and when the film is exposed in the usual way and wound on the reel or spool 6, the rear end of the paper 1 and the free end of the flap 4 are presented in the position shown in Fig. 2 so that the operator may, by grasping these ends, readily remove the spool and film, first detaching the film-centering devices in the camera. After removal the exposed cartridge may be secured for handling, by moistening the gum on the free end of the flap and securing it to the end of the black paper.

Instead of making the flap in the form of a separate sticker applied as shown, it is obvious that it could be cut out of the black paper and have the dried gum applied to its outer side, as shown in Fig. 4.

The paper and film are generally wound upon a spool such as 6, but this is not absolutely essential.

Of course, this lifting and securing arrangement could be used on strips for other purposes than film rolls.

I claim as my invention:

1. The combination with a strip of flexible material adapted to be wound into a roll, of a lifting flap on the outer side near the free end thereof but removed from the extremity of the latter, one end of said flap being free and the other being connected with the strip.

2. The combination with a strip of flexible material adapted to be wound into a roll, of a flap on the outer side near the free extremity thereof but removed from the extremity of the latter, one end of said flap being connected with the strip and the other being free and arranged to overlap said end and to be secured thereto when the roll is formed.

3. The combination with a photographic film cartridge embodying a strip of flexible material adapted to be wound into a roll, of a flap on the outer side of said strip near the free end thereof but removed from the extremity of the latter, one end of said flap being connected with the strip and the other being free and arranged to overlap said end when the roll is formed and dry adhesive material applied to the said free end of the flap.

4. A photographic cartridge embodying a strip of opaque flexible material and a shorter strip of flexible photographic film secured thereto, the whole adapted to be wound into a roll with the opaque strip outside and a flap on the outer side of the opaque strip near its free end but removed from the extremity thereof, one end of said flap being connected with the strip and the other being free and having a dried adhesive thereon, the free end of said flap and the outer end of the strip serving as a means for lifting the roll and the free end of the flap when secured to the outer end of said strip serving as a means for fastening the latter.

5. A film cartridge embodying a flexible strip of opaque material, a shorter strip of flexible sensitized photographic film secured thereto, the whole adapted to be wound into a roll with the opaque strip on the outside, a flap on the opaque strip near the outer end thereof, but removed from the extremity of the latter, one end of said flap being connected to the strip and the opposite free end extending rearward of the said outer end of the strip and adapted to overlap the latter when formed into a roll, said flap having dried adhesive on its inner surface.

6. As an article of manufacture, a photographic cartridge embodying a spool or center, a strip of opaque material and a shorter strip of flexible sensitized photographic film wound together thereon with the opaque material outermost, a flap connected at one end to the interior end of the opaque strip which is on the inside of the roll at a point removed from the extremity thereof a distance approximating the circumference of the roll and having a free end extending rearwardly from the latter, whereby the free end of the flap and the interior end of the opaque strip are brought into adjacent exterior positions when the strips are rewound into a similar roll where they can be utilized in lifting the latter, said members being adapted to over-lap and one being provided with a dry adhesive for securing it to the other.

THOMAS M. K. OVERLAND.

Witnesses:
O. TINSLAND,
SARA HEGLAND.